United States Patent Office 3,154,613
Patented Oct. 27, 1964

3,154,613
SPINNING FILAMENTS FROM SOLUTIONS IN CONCENTRATED SULFURIC ACID OF A POLYAMIDE AND SALT
Martin E. Epstein, Warren Township, Somerset County, and Arthur W. Greenstreet, Union, N.J., assignors to Celanese Corporation of America, New York, N.Y., a corporation of Delaware
No Drawing. Filed Mar. 29, 1962, Ser. No. 183,362
6 Claims. (Cl. 264—184)

This invention relates to an improved process for the production of shaped articles such as filaments of condensation polymers.

There has been proposed in Serial No. 83,981, filed January 23, 1961 by Cipriani and assigned to the same assignee as this application, the entire disclosure of which is incorporated by reference, a method for the formation of shaped articles of condensation polymers containing repeating =NCO— groups, utilizing a solution of the polymer in concentrated sulfuric acid. This process is particularly satisfactory for the production of shaped articles of the "difficulty meltable" polymers, i.e., the polymers which cannot be easily shaped using melt extrusion techniques because they tend to seriously degrade and/or further polymerize to a useless infusible mass, when heated to a temperature sufficient to melt them.

While the foregoing process and the resulting products are satisfactory in many applications, there are instances when improved process stability, i.e., a decreased tendency for the shaped articles such as a filament to rupture on wet spinning, and improved tensile properties of the shaped article, are very desirable.

It is an object of this invention to provide an improved process for the production of shaped articles such as filaments from linear condensation polymers having amide groups e.g. carbonamide groups (=NCO—) as an integral part of the polymer chain. It is a further object of this invention to provide a process of wet spinning said polymers from solution in concentrated sulfuric acid whereby improved spinning stability is achieved. It is a still further object of this invention to provide a process for the wet spinning of said polymers from solution in concentrated sulfuric acid whereby shaped articles such as filaments of improved tensile properties are obtained. Other objects will be apparent from the following detailed description and claims.

In accordance with one aspect of the invention, a condensation polymer containing repeating amide groups e.g. =NCO— groups, as an integral part of the polymer chain is dissolved in concentrated sulfuric acid together with an additive which is soluble in concentrated sulfuric acid and is capable of yielding basic bodies in solution which have an affinity for protons equal to or greater than that of bisulfate ions, to form shaping or spinning solutions. A shaped article such as a filament or film may then be formed by extruding the solution through at least one opening of predetermined cross-section having at least one thin dimension, i.e., the orifices of a spinneret or a slot-shaped opening, into a liquid coagulant for the polymer.

The additives contemplated under this invention may be dissolved in the spinning solution, i.e., the solution of polymer in concentrated sulfuric acid, to yield anions, cations or neutral bodies which are at least as strongly basic as bisulfate ions. Thus, if the additive dissolves in concentrated sulfuric acid to yield a base $B^n$, where $n$ is the amount of charge which may be positive, negative or neutral, the following reaction occurs $$H_2SO_4 + B^n \rightleftharpoons HB^{n+1} + HSO_4^-$$

The equilibrium constant of this equation is represented by $$K = \frac{[HB^{n+1}][HSO_4^-]}{[H_2SO_4][B^n]}$$

The base, $B^n$, obtained as a result of the dissolution of the additive in concentrated sulfuric acid is such that the above equilibrium constant, K, is equal to or greater than unit. Expressed differently, the additive yields a base $B^n$ when dissolved in concentrated sulfuric acid such that the corresponding acid $HB^{n+1}$, is no stronger and is preferably weaker than sulfuric acid with respect to the ionization of its first hydrogen atom, that is, the acid $HB^{n+1}$ has a dissociation constant with respect to the equation of dissociation, $HB^{n+1} \rightleftharpoons + B^n$, which is no greater than the dissociation constant of sulfuric acid with respect to its first hydrogen atom. The latter dissociation constant is about 0.4 as set out, for example in Lange, Handbook of Chemistry, Seventh Edition (1949), page 1408. Whether the aforementioned equilibrium constant, K, is equal to or greater than unity, or whether the dissociation of the acid $HB^{n+1}$ is equal to or less than the dissociation of sulfuric acid with respect to its first hydrogen atom, can be determined from the data in standard reference works such as the aforementioned Handbook of Chemistry, International Critical Tables, etc., or can be obtained by dissolving a small amount of additive in concentrated sulfuric acid and determining the actual concentration of the ions present by any of the various methods known in the art, e.g. through determination of freezing point depression, electrical conductance of the solution, etc.

Some specific classes of substances contemplated as additives are for example inorganic and organic salts which are soluble in concentrated sulfuric acid. Some salts which may be utilized are, for example, inorganic salts, e.g. the ammonium and alkali metal sulfates and phosphates such as ammonium sulfate, sodium sulfate, potassium sulfate, lithium sulfate, disodium phosphate and diammonium phosphate, and organic salts, e.g. of aliphatic and aromatic carboxylic acids such as the ammonium and alkali metal benzoates and acetates, such as ammonium benzoate. These salts are particularly suitable as additives because they result in comparatively little if any hydrolysis, degradation of polymer, or corrosion of equipment due to the presence of an excessive amount of hydronium ions.

The condensation polymers to which the process of this invention may be applied are, for example, the polyamides proper, e.g. the nylons, wherein =NCO— groups are attached to carbon atoms on each side, the polyurethanes which contain repeating =NCOO— groups, and the polyureas which contain repeating =NCON= groups. While the process may be beneficially carried out on solutions of polymers such as polyhexamethylene adipamide and polycaprolactam, it is particularly suitable for the production of filaments of the "difficultly meltable" polymers, i.e., the polymers which cannot easily be shaped using melt extrusion techniques because they tend to seriously degrade and/or further polymerize to a useless infusible mass when heated to a temperature sufficient to melt them. These polymers include, for example, high melting polymers, e.g. polyamides proper melting above 275° C. and in general polymers having cyclic groups, e.g., meta- or paraphenylene, cycloalkylene groups such as 1,4-cyclohexylene and/or heterocyclic groups such as piperazylene or an alkyl substituted piperazylene group e.g. 2-lower alkyl piperazylene such as 2-methyl piperazylene or 2,5-di-lower alkyl piperazylene such as 2,5-dimethyl piperazylene, as an integral part of the polymer chain.

Some contemplated polyamides are those, for example, which have repeating structural units of the formula —NR—Y—NR'—CO—Y'—CO— which result from the condensation of a dicarboxylic acid or a derivative thereof e.g., a salt, acyl halide, or ester of such an acid, with a diamine, wherein the R's which may be the same or different are hydrogen or monovalent organic radicals e.g. lower alkyl such as methyl or ethyl or may constitute a single ring-forming divalent radical, and the Y's, which also may be the same or different, are divalent organic radicals such as alkylene e.g., ethylene, tetramethylene or hexamethylene, arylene such as para- or meta-phenylene, para- or meta-xylylene, or para- or meta-diethylene benzene, or cycloalkylene such as 1,4-cyclohexylene. The formula —NR—Y—NR'— is thus intended to include divalent heterocyclic radicals such as those derived from piperazine, and alkyl and di-alkyl piperazines, e.g. 2-methyl and 2,5-dimethyl piperazines and 2-ethyl and 2,5-diethyl piperazines, wherein the open bonds are attached to the nitrogen atoms. The chemical structure of the polymer and/or the polymerization technique used is such that a relatively high melting polymer is obtained.

An important group of polyamides within the above group are those in which Y and/or Y' is or contains a para- or metaphenylene radical or a 1,4-cyclohexylene radical, and particularly important are condensation products of a diamine and terephthalic acid or a derivative of terephthalic acid e.g. terephthaloyl chloride or a dialkyl terephthalate. Some specific polymers within this latter group are poly (polymethylene) terephthalamides wherein the polymethylene groups contain 2 to 10 carbon atoms, e.g. polyhexamethylene terephthalamide, polyoctamethylene terephthalamide, polytetramethylene terephthalamide, polyethylene terephthalamide, and polypiperazylene terephthalamide. Other polyterephthalamides are poly-o-, m-, and p-phenylene terephthalamides, and poly-o-, m- and p-diethylene-phenylene terephthalamides, the latter produced, for example, by condensing an ester-forming derivative of terephthalic acid with para-bis (betaaminoethyl) benzene. The polyterephthalamides when shaped in accordance with the invention exhibit a particularly good combination of properties, e.g. mechanical properties such as tenacity and elongation, water insensitivity as indicated by high wet stiffness and low shrinkage, and high sensitivity to disperse and acid dyes.

Also contemplated are high melting autocondensation polymers, e.g. melting about 275° C., of an aminocarboxylic acid or a lactam or other derivative of such an acid, which polymers have repeating structural units of the formula —NR—Y—CO— wherein R and Y are as defined above. Some specific polyamides melting above 275° C. within this group are polymers of the following: 1-carboxymethyl-4-aminocyclohexane or its lactam, 1-carboxymethyl-3-aminocyclopentane or its lactam.

The polyurethanes contemplated are polymers having repeating structural units of the formulas

—NR—Y—NR'—CO—O—Y'—CO—O— resulting for example, from the condensation of a diamine with a bis (chloroformate) of a dihydric alcohol or phenol, where the R's and Y's are as described above in connection with the polyamides, and the chemical structure of the polymer and/or the polymerization techniques used are such that a polymer melting above 179° C., preferably above 210° C., is obtained. Particularly preferred are polyurethanes prepared from dihydric alcohols or phenols containing a meta- or paraphenylene or a 1,4-cyclohexylene radical. Some specific polyurethanes which may be used are the condensation product of piperazine with the bis (chloroformate) of bis (p-hydroxyphenyl) propane-2,2, the condensation product of piperazine with the bis (chloroformate) of hydroquinone and the condensation product of tetramethylene diamine with the bis (chloroformate) of butane-diol-1,4 each of which has a melting point above 210° C.

The contemplated polyureas have repeating structural units of the formula

—CO—NR—Y—NR—CO—NR'—Y'—NR'— wherein the R's and Y's are as defined above. They may be synthesized, for example, by the addition of a diisocyanate to a diamine, the condensation of a diurethane with a diamine, the condensaion of a carbon oxyhalide such as phosgene with a diamine, or by heating an alpha/beta diurea with a diamine, the chemical structure of the polymer and/or the polymerization technique being such that a polymer melting above 179° C., preferably above 210° C. is obtained. Some specific polyureas contemplated are those obtained from the reaction of hexamethylene diisocyanate with hexamethylene diamine and from the reaction of m-phenylene diisocyanate with m-phenylene diamine, each of which polyurea melts above 210° C.

The solutions which are wet spun in accordance with this invention are formed by dissolving the polymer and additive in sulfuric acid of 75 to 100%, preferably 95 to 100% by weight $H_2SO_4$ concentration. Fuming sulfuric acid, e.g. containing up to 6 or 7% by weight or even higher of free sulfur trioxide, may also be used. A suitable concentration of the polymer in the spinning solution is, for example, in the range of 5 to 30% by weight. The amount of additive used may be varied within wide limits and no amount is too small or too large as long as it yields a perceptible advantage in the operation of the process or the quality of the product as set out below. One suitable range of concentration of additive is for example 1 to 15%, preferably 2 to 8% based on the weight of the solvent.

A particularly suitable liquid coagulant is an aqueous solution of sulfuric acid having a concentration considerably lower than that of the acid in which the polymer is dissolved and low enough such that the polymer is coagulated into a shaped article. When using aqueous sulfuric acid as the liquid coagulant, the concentration of sulfuric acid in said liquid coagulant, i.e. the spin bath may be varied considerably depending on various modification of the process. However, such concentration, especially when spinning polyterephthalamides such as polyhexamethylene terephthalamide, will in many cases be below 60% by weight, and, in some cases may be as low as 40%. Moreover, concentrations lower than 40% may be used in some cases. The temperature of the spin bath into which the spinning solution is extruded may be, for example, in the range of 0 to 100° C., preferably 30 to 60° C.

The polymer solutions of this invention may also be wet spun into coagulating or spin baths other than aqueous sulfuric acid. For example at temperatures around 20° C. the sulfuric acid solutions of this invention, e.g. of polyhexamethylene terephthalamide may be extruded into aqueous formic acid of 52 to 68% by weight formic acid concentration or into aqueous acetic acid of 52 to 63% by weight concentration. The solutions may also be extruded into spin baths of aqueous formic or acetic acid of considerably higher temperature e.g. 35 to 55° C. in which case lower acid concentrations may be used.

The spinning solutions of this invention may be spun at a spinning speed, e.g. at the first takeup roll, of for example, 10 to 150 meters per minute to obtain filaments having a denier in the range, for example of 0.1 to 50. The drawdown ratio at first take-up roll may be, for example, within the range of 1 to 15 where the drawdown ratio is defined as the ratio of the denier of the dry polymer in the extruded stream, i.e. the weight in grams of dry polymer in a stream of spinning solution 9000 meters long and having the same cross section as the orifice, to the denier of the taken up filament.

In addition to filaments useful, for example in the manufacture of textiles and industrial fibrous products such as tire cord, the solutions and process of this invention may also be used to make other shaped articles, e.g. self-importing films, by means of analogous wet extrusion techniques. Such films are useful, for example, as protective coverings.

The following examples further illustrate the invention.

*Example I*

To concentrated sulfuric acid of 97.5% by weight $H_2SO_4$ concentration was added ammonium sulfate in an amount of 5% based on the weight of the solvent. The temperature of the mixture was maintained at 25–30° C. and stirred until all the ammonium sulfate went into solution. After cooling to room temperature, polyhexamethylene terephthalamide having an inherent viscosity of 1.03 measured as a solution of 0.4 gram of polymer per deciliter of concentrated sulfuric acid solvent at 25° C., was added in an amount of 17.0% based on the weight of the solution. The solution was mixed at 40–50° C. for 2 hours until the polymer dissolved after which it had a Synchro-Lectric viscosity of 2240 poises at 25° C.

The solution was filtered and extruded in a horizontal direction through a jet hole 100 microns in diameter into a spin bath of aqueous sulfuric acid of 47.6% by weight $H_2SO_4$ concentration maintained at a temperature of about 47.5° C. The spin bath was contained in an open trough one meter long and the spin bath was circulated cocurrent with the direction of extrusion at a velocity between 0.1 and 2 meters per minute. The filament was snubbed in an upward direction around a guide located in the spin bath near its exit end such that the filament defined an angle of 135° around the guide and was pulled around another guide located outside the exit end of the spin bath so as to resume its horizontal direction. The filament was then taken up on a perforated bobbin at a take-up speed of 50 meters per minute, washed with water until acid-free and dried at constant length at room temperature.

The dry filament had a denier of 2.7, a tenacity of 3.07 grams per denier, an elongation of 71%, a tensile factor of 25.8 (product of tenacity in grams per denier and the square root of the percent elongation). The polymer making up the filament had an inherent viscosity of 0.91 measured as a 0.4% by weight solution of the polymer in sulfuric acid at 25° C.

*Example II*

The procedure of Example I was repeated except that the inherent viscosity of the initial polymer was 1.15, the spinning solution contained 15.0% by weight of polymer and 5% based on the weight of the solvent of sodium sulfate instead of ammonium sulfate as additive and had a viscosity of 3200 poises at 25° C., and the spin bath contained 48.2% by weight of $H_2SO_4$.

The dry filament had a denier of 2.9, a tenacity of 3.2 grams per denier, an elongation of 63% and a tensile factor of 25.4 and was made up of polymer having an inherent viscosity of 1.15.

*Example III*

The procedure of Example I was repeated except that the spinning solution contained 17% by weight of polymer and 5% based on the weight of the solvent of lithium sulfate as additive instead of ammonium sulfate, and had a viscosity of 3600 poises at 25° C., and the spin bath contained 48.1% by weight of $H_2SO_4$.

The filament had a denier of about 3.0, a tenacity of 3.19 grams per denier, an elongation of 65%, a tensile factor of 25.8 and was made up of polymer having an inherent viscosity of 0.92.

*Example IV*

The procedure of Example I was repeated except that the spinning solution contained 5% based on the weight of solvent of potassium sulfate as additive instead of ammonium sulfate and had a viscosity of 2400 poises at 25° C., and the spin bath contained 47.6% by weight of $H_2SO_4$.

The dry filament had a denier of 2.5, a tenacity of 2.89 grams per denier, an elongation of 74%, a tensile factor of 24.8 and was made up of polymer having an inherent viscosity of 0.90.

*Example V*

The procedure of Example I was repeated except that the spinning solution contained 16.0% by weight of polymer and 3% based on the weight of solvent of disodium phosphate, $Na_2HPO_4$ as additive instead of ammonium sulfate, and had a viscosity of 3800 poises at 25° C., and the spin bath contained 48.3% by weight of $H_2SO_4$.

The dry filament had a denier of 2.8, a tenacity of 2.92 grams per denier, an elongation of 59%, a tensile factor of 22.5 and was composed of polymer having an inherent viscosity of 0.94.

*Example VI*

The procedure of Example I was repeated except that the spinning solution contained 16.0% by weight of polymer and 5% based on the weight of the solvent of diammonium phosphate, $(NH_4)_2HPO_4$, as additive instead of ammonium sulfate and had a viscosity of 2000 poises at 25° C., and the spin bath contained 47.3% by weight of $H_2SO_4$.

The dry filament had a denier of 3.1, a tenacity of 3.16 grams per denier, an elonagtion of 55%, a tensile factor of 23.4, and was composed of polymer having an inherent viscosity of 0.92.

*Example VII*

The procedure of Example I was repeated except that the spinning solution contained 16.0% by weight of polymer and 3% based on the weight of solvent of ammonium benozate as additive instead of ammonium sulfate and had a viscosity of 1900 poises at 25° C., and the spin bath contained 48.4% by weight of $H_2SO_4$.

The dry filament had a denier of 2.6, a tenacity of 2.78 grams per denier, an elongation of 65%, a tensile factor of 22.4 and was composed of polymer having an inherent viscosity of 0.87.

In some instances, it is advantageous to wet spin the filaments in a generally downward direction, and stretching them within the spin bath by pulling them around an obstacle, e.g., a deflecting rod, pin, idler or positively driven roll or other kind of guide. The filaments may then be pulled through the spin bath in an upslanting direction and taken up, for example, by positively driven rolls outside the spin bath. In addition to the specific methods disclosed in application Serial No. 83,981, this type of process may be carried out, for example, by extruding the spinning solution downwardly through the orifices of a spinneret located near the end of the inlet leg of a V-shaped spinning tube. The inlet leg may be vertical or inclined, and the yarn may be pulled around a snubbing guide located in the vertex of the spinning tube and then upward through the outlet leg of the spinning tube. The vertical dimension of the spinning tube may be varied within wide limits, e.g. 50 to 550 centimeters and the vertex angle of the spinning tube may also vary widely, e.g., from 20 to 165°. If the vertex angle is significantly below 90°, the inlet leg will be vertical or inclined, while if this angle is close to 90° or above, the inlet leg will generally be inclined. The distance of the snubbing guide from the face of the spinneret may vary within wide limits, e.g. from about 10 to about 500 centimeters. Preferably, this distance is from about 10 to 100 centimeters when the spinning speed, i.e., the take-up speed of the yarn, is around 10 meters per minute, from about 50 to 200 centimeters when the spinning speed is around 50 meters per minute, and from about 100 to 400 centimeters when the spinning speed is around 150 meters per minute.

The following example illustrates an embodiment of the process of the invention employing downward multifilament spinning by means of a V-shaped spinning tube.

Example VIII

Polyhexamethylene terephthalamide having an inherent viscosity of 1.32 measured as described in Example I and ammonium sulfate were dissolved in concentrated sulfuric acid of 99% by weight $H_2SO_4$ concentration to yield a solution containing 15.8% by weight of polymer and 5% by weight of ammonium sulfate and having a viscosity of 2200 to 2500 poises at 25° C. The solution was filtered and extruded through a spinneret containing 100 holes each 100 microns in diameter and arranged concentrically in circles in a downward direction into the vertical inlet leg of a V-shaped spinning tube containing as circulating spin bath aquous sulfuric acid of 47.2% by weight $H_2SO_4$ concentration at a temperature of 45° C. The vertical inlet leg of the spinning tube was 152 centimeters long, the vertex angle at the bottom of the tube was 45° and the upslanting outlet leg was about 215 centimeters long. The formed filaments were snubbed around a pin located in the vertex of the spinning tube about 127 centimeters from the face of the spinneret located in the spinning tube near its inlet end. The filaments were taken up at a speed of 60 meters per minute by a take-up roll located outside the outlet end of the spinning tube, washed with water until substantially acid-free, and dried at constant length on a drum drier.

The filaments had a denier per filament of 2.3, a tenacity of 3.50 grams per denier, an elongation of 36% and a tensile factor of 21.0.

The drawdown ratio in each of the above examples was between about 7 to 1 and about 9 to 1.

The additives employed in the process of this invention result in the production of filaments having mechanical properties, e.g. tenacity and tensile factor, superior to the properties of filaments obtained by means of a similar process but without the employment of an additive. Moreover, the use of these additives renders the process more stable, e.g. as indicated by a more rapid rate of filament coagulation manifested by less filament sag from the horizontal in the spin bath in a horizontal spinning process and the appearance of partial opacity in the filament in the spin bath at a closer distance from the face of the spinneret. The additives also result in the toleration of a greater range of $H_2SO_4$ in the spin bath without rupture of the filament. In addition, by providing for more rapid coagulation of the filaments, the additives of this invention allow for greater improvement of filament properties due to drawing or stretching.

The values of tenacity and elongation given in the examples were determined with an Instron Tensile Tester at a 3⅓ inch gauge length and a 60% per minute strain rate, in air at 23° C. and 65% relative humidity.

It is to be understood that the foregoing detailed description is given merely by way of illustration and that many variations may be made therein without departing from the spirit of our invention.

Having described our invention what we desire to secure by Letters Patent is:

1. In a process of extruding a solution in concentrated sulfuric acid of at least 75% by weight acid concentration of a fiber-forming condensation polymer having repeating amide groups as an integral part of the polymer chain through an opening of predetermined cross-section having at least one thin dimension, into an aqueous acidic coagulant for said polymer, to form a shaped article, the improvement comprising including in said solution at least 1% based on the weight of the solvent of a salt which is dissolved in said sulfuric acid and yields ions in solution which have an affinity for protons at least equal to that of bisulfate ions, resulting in a reduced tendency of said shaped article to rupture during coagulation.

2. The process of claim 1 wherein said polymer is polyhexamethylene terephthalamide.

3. The process of claim 2 wherein said salt is an inorganic sulfate.

4. The process of claim 3 wherein said inorganic sulfate is ammonium sulfate.

5. In a process of extruding a solution in concentrated sulfuric acid of at least 75% by weight acid concentration, of 5 to 30% by weight of the solvent of a fiber-forming condensation polymer having repeating amide groups as an integral part of the polymer chain through an orifice of predetermined cross-section into aqueous sulfuric acid having an acid concentration lower than that of the acid in which the polymer is dissolved such that the polymer is coagulated into a filament, the improvement comprising including in said solution 1 to 15% based on the weight of the solvent of a salt which is soluble in said concentrated sulfuric acid and yields ions in solution which have an affinity for protons at least equal to that of bisulfate ions, resulting in a reduced tendency of said filament to rupture during coagulation in said aqueous sulfuric acid.

6. The process of claim 5 wherein said aqueous sulfuric acid has a concentration of from 40 to 60% by weight.

References Cited in the file of this patent

UNITED STATES PATENTS

| | | |
|---|---|---|
| 2,484,523 | McLellan | Oct. 11, 1949 |
| 2,489,569 | Foulds et al. | Nov. 29, 1949 |
| 2,571,975 | Waltz | Oct. 16, 1951 |
| 2,684,348 | Dietrich et al. | July 20, 1954 |
| 2,790,700 | Stanton et al. | Apr. 30, 1957 |
| 3,040,003 | Beaman | July 19, 1962 |